(12) United States Patent
Bojanowski et al.

(10) Patent No.: US 12,330,239 B2
(45) Date of Patent: Jun. 17, 2025

(54) LASER NOTCHING APPARATUS FOR CUTTING OF ELECTRODE SHEETS

(71) Applicant: Ford Global Technologies, LLC, Dearborn, MI (US)

(72) Inventors: Paul John Bojanowski, Macomb Township, MI (US); Hannah Bever, South Lyon, MI (US); Andrew William Sherman, Commerce Township, MI (US); Michael Orr, Ferndale, MI (US); Paul Andrew Pierzecki, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 17/667,647

(22) Filed: Feb. 9, 2022

(65) Prior Publication Data

US 2023/0249291 A1   Aug. 10, 2023

(51) Int. Cl.
 *B23K 26/38* (2014.01)
(52) U.S. Cl.
 CPC ..................... *B23K 26/38* (2013.01)
(58) Field of Classification Search
 CPC .......... B23K 26/38; B23K 26/16; B08B 5/04; H01M 50/533; H01M 4/04
 USPC ..................................................... 219/121.72
 See application file for complete search history.

(56) References Cited

U.S. PATENT DOCUMENTS

| 5,113,055 | A | * | 5/1992 | Kuriyama | .......... | B23K 26/1476 |
| | | | | | | 219/121.72 |
| 5,760,369 | A | * | 6/1998 | Wenkman | .............. | B23K 26/10 |
| | | | | | | 219/121.85 |
| 6,191,382 | B1 | * | 2/2001 | Damikolas | ............. | B23K 26/40 |
| | | | | | | 219/121.84 |

(Continued)

FOREIGN PATENT DOCUMENTS

| CN | 110116277 A | * | 8/2019 | ........... | B23K 26/082 |
| DE | 102018219619 | | 6/2020 | | |

(Continued)

OTHER PUBLICATIONS

Lutey, et al., High speed pulsed laser cutting of LiCoO2 Li-ion battery electrodes, Optics and Laser Technology, Apr. 20, 2017, pp. 90-96, vol. 94 (2017), Elsevier Ltd.

(Continued)

*Primary Examiner* — Jimmy Chou
(74) *Attorney, Agent, or Firm* — Burris Law, PLLC

(57) ABSTRACT

An apparatus for cutting electrode sheets includes a conveyor and a laser device. The conveyor is configured to move an original sheet including an electrode portion and an ear portion extending from an edge of the electrode portion. The laser device is configured to move a laser to cut out a tab connected to the electrode portion from the ear portion of the original sheet. The laser device is also configured to move the laser from one edge of the electrode portion to another edge of the electrode portion to cut and separate a respective electrode sheet including the tab from the original sheet. The laser is configured to cut out the tab from the ear (Continued)

portion and cut and separate the respective electrode sheet including the tab from the original sheet as the conveyor is moving the original sheet.

20 Claims, 8 Drawing Sheets

(56) References Cited

U.S. PATENT DOCUMENTS

| | | | | |
|---|---|---|---|---|
| 6,358,347 | B1* | 3/2002 | Thornton | B29C 66/0246 |
| | | | | 156/203 |
| 8,334,071 | B2* | 12/2012 | Morishima | H01M 4/139 |
| | | | | 429/211 |
| 8,365,981 | B1* | 2/2013 | Perlsweig | B65D 5/48024 |
| | | | | 229/120.32 |
| 8,728,849 | B1* | 5/2014 | Mattos | H01L 31/0392 |
| | | | | 219/121.72 |
| 10,283,753 | B2* | 5/2019 | Chong | H01M 50/578 |
| 10,981,249 | B2* | 4/2021 | Watanabe | B23K 26/402 |
| 11,673,209 | B2* | 6/2023 | Umehara | H01M 50/46 |
| | | | | 219/121.72 |
| 2007/0241083 | A1* | 10/2007 | Yamaguchi | B23K 26/0876 |
| | | | | 219/121.59 |
| 2013/0126594 | A1* | 5/2013 | Gasior | B65D 5/443 |
| | | | | 229/198.2 |
| 2013/0252086 | A1* | 9/2013 | Stern | H01M 4/0402 |
| | | | | 29/623.5 |
| 2014/0053383 | A1* | 2/2014 | Holl | B23K 26/38 |
| | | | | 29/623.3 |
| 2015/0026970 | A1* | 1/2015 | Jung | H01M 10/0431 |
| | | | | 29/877 |
| 2015/0068945 | A1* | 3/2015 | Baker | B65D 5/0055 |
| | | | | 206/509 |
| 2015/0068946 | A1* | 3/2015 | Baker | B65D 5/427 |
| | | | | 206/509 |
| 2015/0090702 | A1* | 4/2015 | Ban | B23K 26/083 |
| | | | | 219/121.81 |
| 2015/0207129 | A1* | 7/2015 | Tsurumi | H01M 50/46 |
| | | | | 429/211 |
| 2015/0352667 | A1* | 12/2015 | Hemes | B23K 26/144 |
| | | | | 219/121.61 |
| 2016/0036009 | A1* | 2/2016 | Cho | B23K 26/244 |
| | | | | 219/121.72 |
| 2016/0250714 | A1* | 9/2016 | Zhang | B23K 26/36 |
| | | | | 219/121.61 |
| 2016/0263705 | A1* | 9/2016 | Kim | B23K 26/042 |
| 2017/0058389 | A1* | 3/2017 | Gayden | H01M 4/13 |
| 2017/0072512 | A1* | 3/2017 | Umehara | B23K 26/402 |
| 2018/0079035 | A1* | 3/2018 | Watanabe | B23K 26/402 |
| 2018/0354069 | A1* | 12/2018 | Erickson | B23K 26/38 |
| 2019/0081345 | A1* | 3/2019 | Lee | H01M 4/0404 |
| 2019/0151996 | A1* | 5/2019 | Robinson | B23K 26/0619 |
| 2019/0198853 | A1* | 6/2019 | Nishio | H01M 4/043 |
| 2019/0198860 | A1* | 6/2019 | Nishio | H01M 4/70 |
| 2019/0267606 | A1* | 8/2019 | Lee | H01M 4/0433 |
| 2019/0329353 | A1* | 10/2019 | Dai | B23P 15/00 |
| 2020/0122273 | A1* | 4/2020 | Xu | H01M 4/0471 |
| 2020/0136191 | A1* | 4/2020 | Kojima | H01M 10/0585 |
| 2020/0223010 | A1* | 7/2020 | Umehara | H01M 4/0404 |
| 2020/0276670 | A1* | 9/2020 | Watanabe | B23K 26/08 |
| 2020/0343532 | A1* | 10/2020 | Aya | H01M 4/02 |
| 2020/0353259 | A1* | 11/2020 | Yang | B23K 26/38 |
| 2020/0406401 | A1* | 12/2020 | Breuer | H01M 4/75 |
| 2021/0066687 | A1* | 3/2021 | Que | H01M 50/536 |
| 2021/0367232 | A1* | 11/2021 | Park | B65H 35/008 |
| 2022/0001492 | A1* | 1/2022 | Böhm | B23K 26/0838 |
| 2023/0088137 | A1* | 3/2023 | Kumazawa | B23K 26/38 |
| | | | | 219/121.67 |

FOREIGN PATENT DOCUMENTS

| | | |
|---|---|---|
| DE | 102019209183 | 12/2020 |
| EP | 3415265 | 12/2018 |

OTHER PUBLICATIONS

Park, et al., Challenges, laser processing and electrochemical characteristics on application of ultra-thick electrode for high-energy lithium-ion battery, Journal of Power Sources, Sep. 18, 2020, pp. 1-9, vol. 482 (2021), Elsevier B.V.

* cited by examiner

LASER NOTCHING APPARATUS FOR CUTTING OF ELECTRODE SHEETS

FIELD

The present disclosure relates to manufacturing equipment for use in cutting electrode sheets for batteries.

BACKGROUND

The statements in this section merely provide background information related to the present disclosure and may not constitute prior art.

A battery such as a lithium ion second battery, for example, comprises positive electrodes, negative electrodes, and a separator. The battery is formed by cutting respective positive and negative electrode sheets and/or separator sheets and superposing the positive electrode sheets and negative electrode sheets alternately such that the separator is interposed between the positive electrode sheets and negative electrode sheets. There exists a number of apparatuses and methods for cutting respective positive or negative electrode sheets from a roll of electrode sheet and cutting respective separator sheets from a roll of separator sheet. Such apparatuses and methods for cutting respective electrode and separator sheets are costly and/or time consuming.

The cost and time related to cutting respective electrode and separator sheets, among other issues related manufacturing batteries, are addressed by the present disclosure.

SUMMARY

This section provides a general summary of the disclosure and is not a comprehensive disclosure of its full scope or all of its features.

In one form, the present disclosure provides an apparatus for cutting electrodes. The apparatus comprises a conveyor and a laser device. The conveyor is configured to move an original sheet comprising an electrode portion and an ear portion extending from an edge of the electrode portion. The laser device is configured to move a laser to cut out a tab connected to the electrode portion from the ear portion of the original sheet. The laser device is also configured to move the laser from one edge of the electrode portion to another edge of the electrode portion to cut and separate a respective electrode sheet comprising the tab from the original sheet. The laser is configured to cut out the tab from the ear portion and cut and separate the respective electrode sheet comprising the tab from the original sheet as the conveyor is moving the original sheet.

In variations of the apparatus for cutting electrode sheets of the above paragraph, which may be implemented individually or in any combination: the conveyor is a vacuum conveyor; the laser is a pulsing laser; the pulsing laser comprises a pulsing rate greater than or equal to 1 Megahertz; the laser is a pulsing laser having a power greater than or equal to 500 Watts; the laser is configured to cut out and separate the tab and the respective electrode sheet from the original sheet in a single pass; the laser comprises a first laser and a second laser, and wherein the first laser cuts out the tab connected to the electrode portion and the second laser cuts and separates the respective electrode sheet comprising the tab; the first laser and the second laser cut simultaneously; a speed of the conveyor is synchronized with a cutting rate of the first laser and a cutting rate of the second laser; an electrode sheet pick-up device positioned downstream of the conveyor and configured to pick-up the respective electrode sheet from the conveyor; the electrode sheet pick-up device is a rotary drum; a rotational speed of the rotary drum is synchronized with a speed of the conveyor; and a speed of the conveyor is synchronized with a cutting rate of the laser device.

In another form, the present disclosure provides an apparatus for cutting electrodes. The apparatus comprises a conveyor and a laser device. The conveyor is configured to move an original sheet comprising an electrode portion and an ear portion extending from an edge of the electrode portion. The laser device comprises a first laser and a second laser. The first laser is configured to move to cut out a tab connected to the electrode portion from the ear portion of the original sheet. The first laser is configured to cut out the tab in a single pass. The second laser is configured to move from one edge of the electrode portion to another edge of the electrode portion to cut and separate a respective electrode sheet comprising the tab from the original sheet. The second laser is configured to cut out the respective electrode sheet in a single pass. The first laser is configured to cut out the tab from the ear portion and the second laser is configured to cut and separate the respective electrode sheet comprising the tab from the original sheet as the conveyor is moving the original sheet.

In variations of the apparatus for cutting electrode sheets of the above paragraph, which may be implemented individually or in any combination: the conveyor is a vacuum conveyor; the laser is a pulsing laser; the pulsing laser comprises a pulsing rate greater than or equal to 1 Megahertz; the laser is a pulsing laser having a power greater than or equal to 500 Watts; and at least one of the first and second lasers comprises a plurality of lasers arranged in tandem.

In yet another form, the present disclosure provides an apparatus for cutting electrodes. The apparatus comprises a vacuum conveyor and a laser device. The vacuum conveyor is configured to move an original sheet comprising an electrode portion and an ear portion extending from an edge of the electrode portion. The laser device comprises a first pulsing laser and a second pulsing laser. The first pulsing laser is configured to move to cut out a tab connected to the electrode portion from the ear portion of the original sheet. The first pulsing laser is configured to cut out the tab in a single pass. The second pulsing laser is configured to move from one edge of the electrode portion to another edge of the electrode portion to cut and separate a respective electrode sheet comprising the tab from the original sheet. The second laser is configured to cut out the respective electrode sheet in a single pass. The first pulsing laser is configured to cut out the tab from the ear portion and the second pulsing laser is configured to cut and separate the respective electrode sheet comprising the tab from the original sheet as the vacuum conveyor is moving the original sheet. A speed of the vacuum conveyor is synchronized with a cutting rate of the first pulsing laser and a cutting rate of the second pulsing laser.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
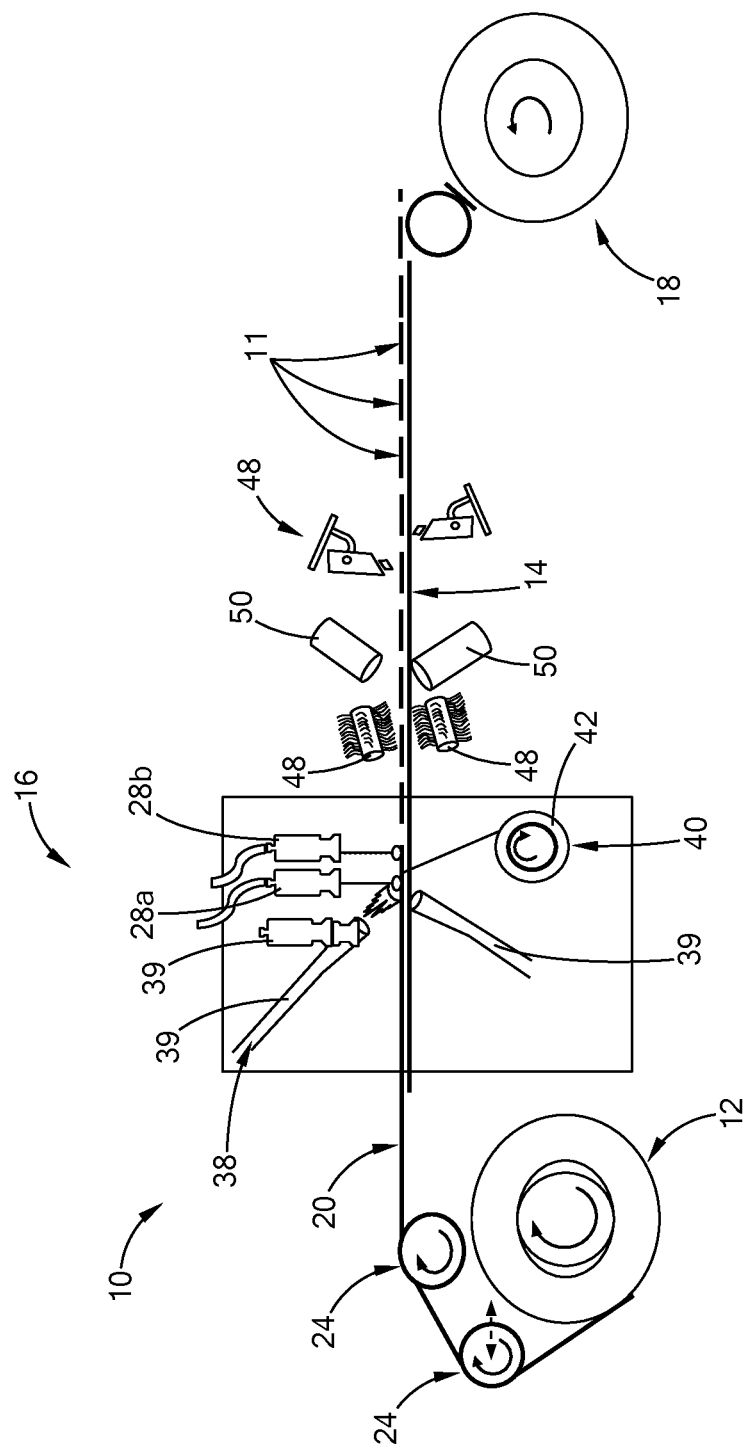
FIG. 1 is a schematic view of an apparatus for cutting electrode sheets from an original sheet according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, an apparatus 10 is provided for cutting respective electrode sheets 11 comprising tabs 13. The apparatus 10 for cutting electrode sheets 11 comprises an unwinder or sheet supply portion 12, a conveyor 14, a laser device 16, and an electrode sheet pick-up device 18. The sheet supply portion 12 is configured to unwind and continuously feed a roll of original sheet 20 to the conveyor 14 for cutting by the laser device 16. The original sheet 20 comprises an electrode portion 20a and an ear portion 20b extending from an edge of the electrode portion 20a. The sheet supply portion 12 also includes a motor 22 such as a servomotor, for example, configured to drive the sheet supply portion 12, thereby feeding the original sheet 20 to the conveyor 14. A plurality of guide rollers 24 are arranged between the sheet supply portion 12 and the conveyor 14 and are configured to guide and support the original sheet 20 as the original sheet 20 is fed from the sheet supply portion 12 to the conveyor 14.

The conveyor 14 is configured to continuously move the original sheet 20 to be cut by the laser device 16. After cutting by the laser device 16, the conveyor 14 is configured to move the respective electrode sheets 11 comprising the tabs 13 to the electrode sheet pick-up device 18 where the respective electrode sheets 11 are picked up from the conveyor 14 and taken to another workstation (e.g., a station where the electrode sheets are stacked into battery cells). In the example illustrated, the conveyor 14 is a vacuum conveyor. It should also be understood that, in some configurations, the conveyor 14 may be a belt driven conveyor, a roller conveyor, or any other suitable conveyor that moves the original sheet 20 while allowing for the original sheet 20 to be cut into respective electrode sheets 11. In some examples, the original sheet 20 is cut by the laser device 16 on a receiver plate (not shown).

The conveyor 14 also includes a motor 26 such as a servomotor, for example, configured to drive the conveyor 14 to move the original sheet 20 and the respective electrode sheets 11. The speed of the conveyor 14 is synchronized with the speed of the sheet supply portion 12 and the electrode sheet pick-up device 18. The conveyor 14 and the sheet supply portion 12 cooperate to make up the web of the apparatus 10. In some examples, the conveyor 14 may comprise a first conveyor and a second conveyor that is separate and adjacent from the first conveyor. The first conveyor is configured to continuously move the original sheet 20 to be cut by the laser device 16 into respective electrode sheets 11. The first conveyor then moves the respective electrode sheets 11 onto the second conveyor. The second conveyor is configured to move the respective electrode sheets 11 to the electrode sheet pick-up device 18 where the respective electrode sheets 11 are picked up from the second conveyor and taken to another workstation. The first and second conveyors are allowed to move at different speeds so that the speed at which the electrode sheets 11 are picked up by the electrode sheet pick-up device 18 is different from the speed at which the original sheet 20 is moved to be cut by the laser device 16. In this way, a gap created between the electrode sheets 11 from cutting by the laser device 16 may be increased to facilitate the electrode sheet pick-up device 18 picking up the electrode sheets 11 from the second conveyor.

The laser device 16 is positioned above the conveyor 14 and comprises a first laser 28a and a second laser 28b. Each of the first and second lasers 28a, 28b of the laser device 16 may be a Galvano type emission device, for example, a Galvano scanner configured to move in the X and Y direction. In one example, the first and second lasers 28a, 28b are pulsing lasers comprising a pulsing rate greater than or equal to one (1) Megahertz. In one example, the first and second lasers 28a, 28b have a power greater than or equal to 500 Watts and a wavelength in the infrared region of the electromagnetic spectrum. The cutting rate of the first and second lasers 28a, 28b is synchronized with the speed of the conveyor 14 and the speed of the sheet supply portion 12.

Figure 5:
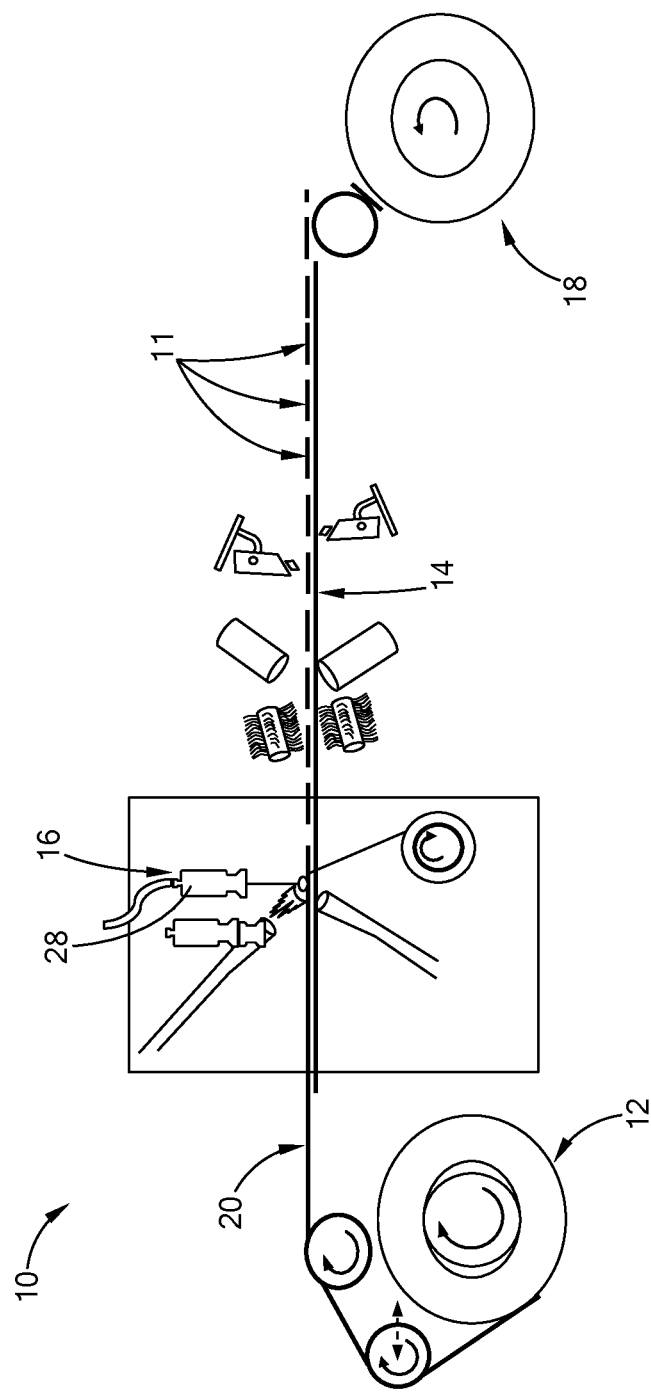
FIG. 5 is a schematic view of another apparatus for cutting electrode sheets from an original sheet according to the principles of the present disclosure.

With reference to FIGS. 1 and 5, the laser device 16 comprises a laser controller 30 that is configured to guide or move the first laser 28a based on one or more first vector models in order to achieve a desired cut in a single pass. In one form, the first vector models may be based on the following equations:

$$\theta = \cos^{-1}\left(\frac{s_4^2 - s_1^2 - \left(\sqrt{s_2^2 + (s_3 - s_4)^2}\right)^2}{-2S_1\sqrt{s_2^2 + (s_3 - s_4)^2}}\right) \quad s_5 = \sqrt{s_2^2 + (s_3 - s_4)^2}$$

Figure 2:
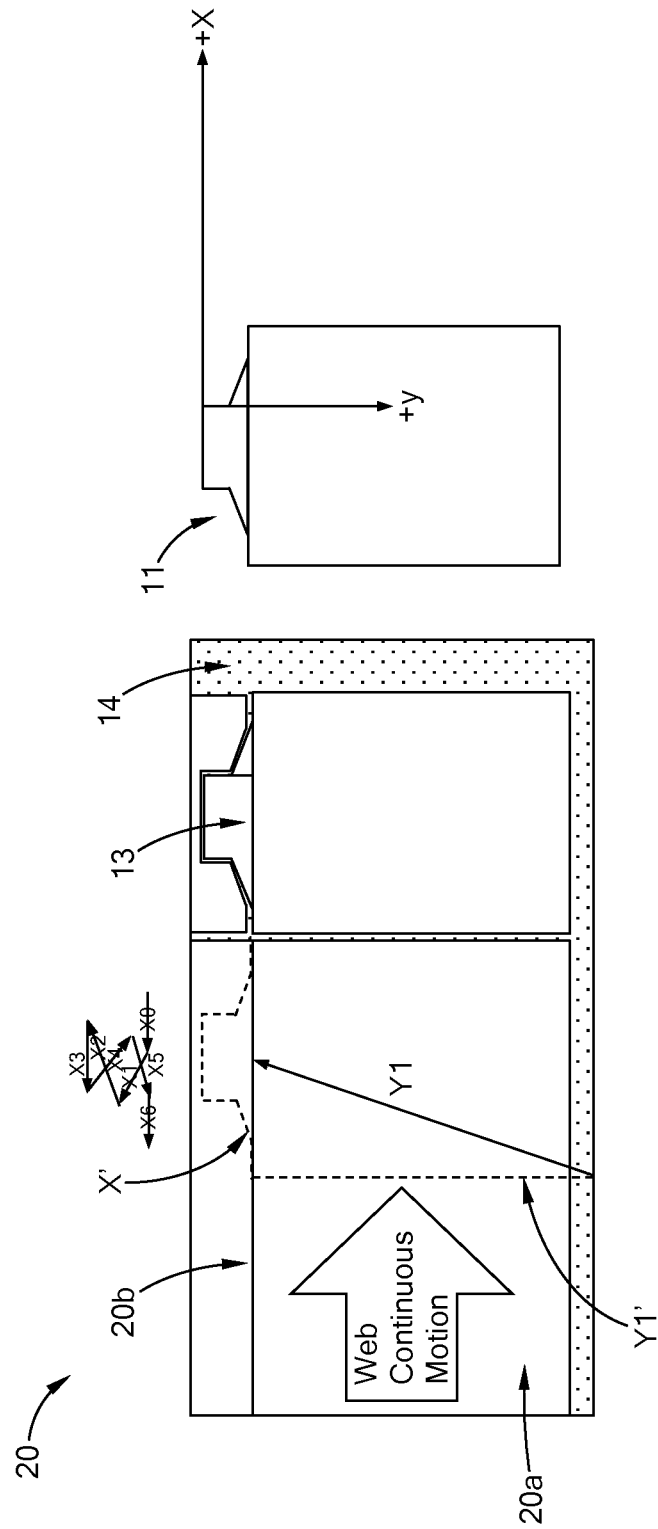
FIG. 2 is a top view of a respective electrode sheet being cut from the original sheet by a laser device of the apparatus of FIG. 1.
Figure 3:
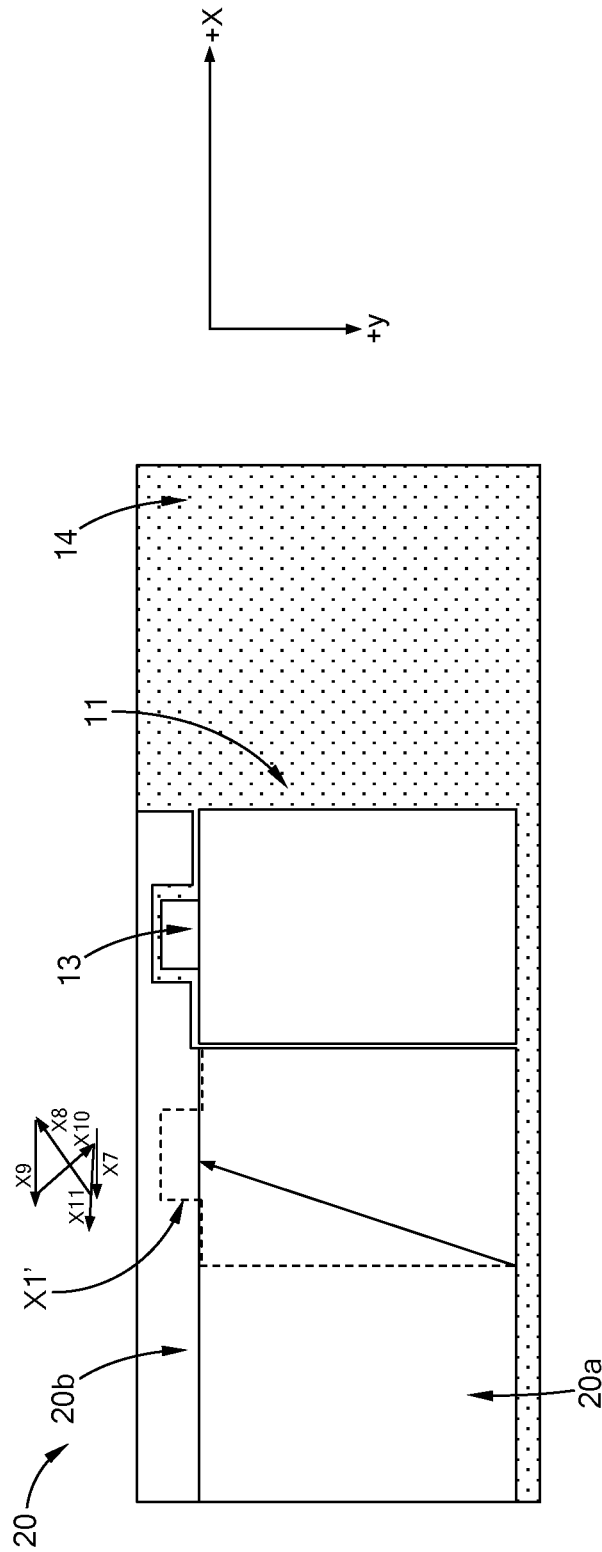
FIG. 3 is a top view of another respective electrode sheet being cut from the original sheet by the laser device of the apparatus of FIG. 1.
Figure 4:
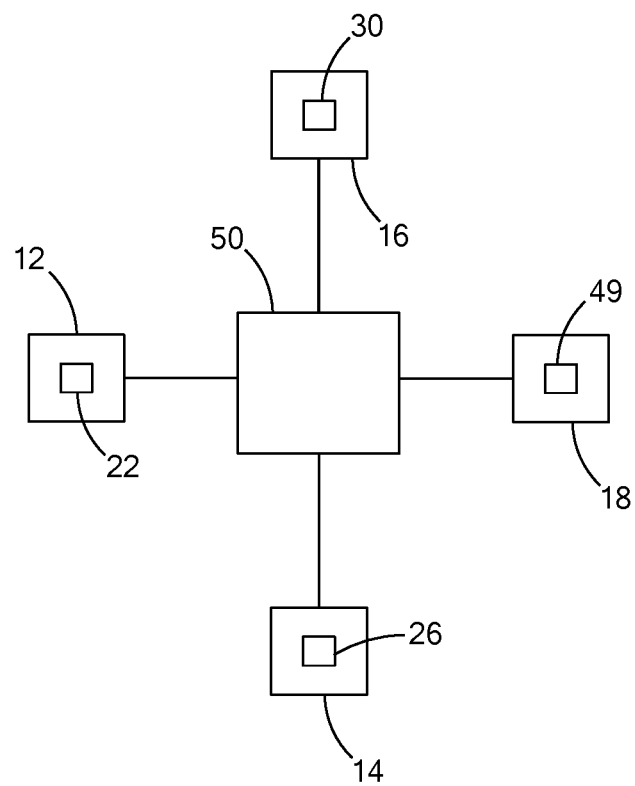
FIG. 4 is a schematic block diagram showing components of the apparatus of FIG. 1.

The beam cutting angle θ and the relative motion length S5 are determined based on a cut length S1, a Y angled length S2, an X angled length S3, a web displacement S4 (e.g., linear movement of the web in the X direction starting from the beginning of a vector path to the end of the vector path based on cutting rate), a cutting velocity of the lasers 28a and a web speed (e.g., the speed of the sheet supply portion 12 and the conveyor 14). The cut length S1, the Y angled length S2, the X angled length S3, the web displacement S4, the cutting velocity of the lasers 28a, 28b, and the web speed are determined based on the predetermined shape of the tab 13. In the example illustrated in FIG. 2, the vector models are defined based on the above parameters such that the first laser 28*a* moves along vector path X0-X6 as the conveyor 14 moves the original sheet 20 in order to cut and separate the tab 13 having a shape defined by X1'. In the example illustrated in FIG. 3, the vector models are defined based on the above parameters such that the first laser 28*a* moves along the vector path X7-X11 as the conveyor 14 moves the original sheet 20 in order to cut and separate the tab 13 having a shape defined by X1', which is rectangular in this example. It should be understood that the shape of the tab 13 may be any suitable shape such as a semi-circular shape or square shape, for example.

The laser controller 30 is also configured to guide or move the second laser 28*b* based on one or more second vector models in order to achieve a desired cut in a single pass. In one form, the vector models are defined such that the second laser 28*b* moves along vector path Y1 as the conveyor 14 moves the original sheet 20 in order to cut and separate the respective electrode sheet 11 having a shape defined by Y1'. Stated differently, the laser controller 30 is configured to control the second laser 28*b* such that the second laser 28*b* moves obliquely from one edge of the electrode portion 20*a* to another edge of the electrode portion 20*a* to cut and separate a respective electrode sheet 11 comprising the tab 13 from the original sheet 20. The second laser 28*b* cuts and separates the respective electrode sheet 11 as the conveyor 14 moves the original sheet 20. In one example, the laser controller 30 is configured to control the first and second lasers 28*a*, 28*b* such that the first and second lasers 28*a*, 28*b* cut the original sheet 20 simultaneously. In another example, the laser controller 30 is configured to control the first and second lasers 28*a*, 28*b* such that the second laser 28*b* cuts the electrode portion 20*a* after the first laser 28*a* cuts the tab 13 from the ear portion 20*b*. The cutting rate of the first laser 28*a* may be the same or different than the cutting rate of the second laser 28*b*. In some forms, as shown in FIG. 5, the laser device 16 may include only one laser 28 that cuts and separates both the tab 13 and the electrode sheet 11 from the original sheet 20.

A fume extraction device 38 is positioned in an area of the laser device 16 and comprises a plurality of fume extractors 39 configured to extract fumes generated from the first and second lasers 28*a*, 28*b* cutting the original sheet 20.

An ear portion collection device 40 is positioned downstream of the laser device 16 and includes a reel 42 to collect the ear portion 20*b* of the original sheet 20 after being cut by the first laser 28*a*. In some forms, guide rollers (not shown) are positioned between the conveyor 14 and the ear portion collection device 40, and are configured to guide the ear portion 20*b* of the original sheet 20 to the ear portion collection device 40 after being cut by the first laser 28*a*.

A cleaning device 46 is positioned downstream of the laser device 16 and comprises cleaning brushes 48 and debris extractors 50 to further remove debris from the electrode sheets 11 prior to being taken up by the electrode sheet pick-up device 18. A vision device 48 is also positioned downstream of the laser device 16 and is configured to determine the quality of the electrode sheets 11 (e.g., the edge quality of the electrode sheets 11) prior to the electrode sheets 11 being taken up by the electrode sheet pick-up device 18.

The electrode sheet pick-up device 18 is configured to pick-up respective electrode sheets 11 from the conveyor 14. In the example illustrated, the electrode sheet pick-up device 18 is a rotary drum configured to continuously rotate to pick-up the electrode sheets 11 from the conveyor 14 and move the electrode sheets 11 to another workstation (e.g., a station where the electrode sheets are stacked into battery cells). That is, the electrode sheet pick-up device 18 picks up the electrode sheets 11 from the conveyor 14 via vacuum suction, for example. The rotational speed of the electrode sheet pick-up device 18 is synchronized with a speed of the conveyor 14 and the cutting rate of the first and second lasers 28*a*, 28*b*. The electrode sheet pick-up device 18 includes a motor 49 such as a servomotor, for example, configured to drive the electrode sheet pick-up device 18. A controller 50 is in communication with the motors 22, 26, 49 of the sheet supply portion 12, the conveyor 14 and the electrode sheet pick-up device 18, respectively, and is configured to control and adjust the speed of the sheet supply portion 12, the conveyor 14 and the electrode sheet pick-up device 18. The controller 50 may also be in communication with the laser device 16

The apparatus 10 described in the present disclosure can be used for lithium-ion battery pouch cells, prismatic cells, wound cells, uni-polar or bi-polar cells, and solid state batteries, for example. The apparatus 10 of the present disclosure provides the benefit of reducing manufacturing time of cutting the electrode sheets. Although the apparatus 10 is described for cutting electrode sheets having a copper tab, it should be understood that the apparatus 10 can also be used to cut electrode sheets having an aluminum tab. It should also be understood that the apparatus 10 can be used to cut separator sheets to be used in manufacturing battery cells.

Figure 6:
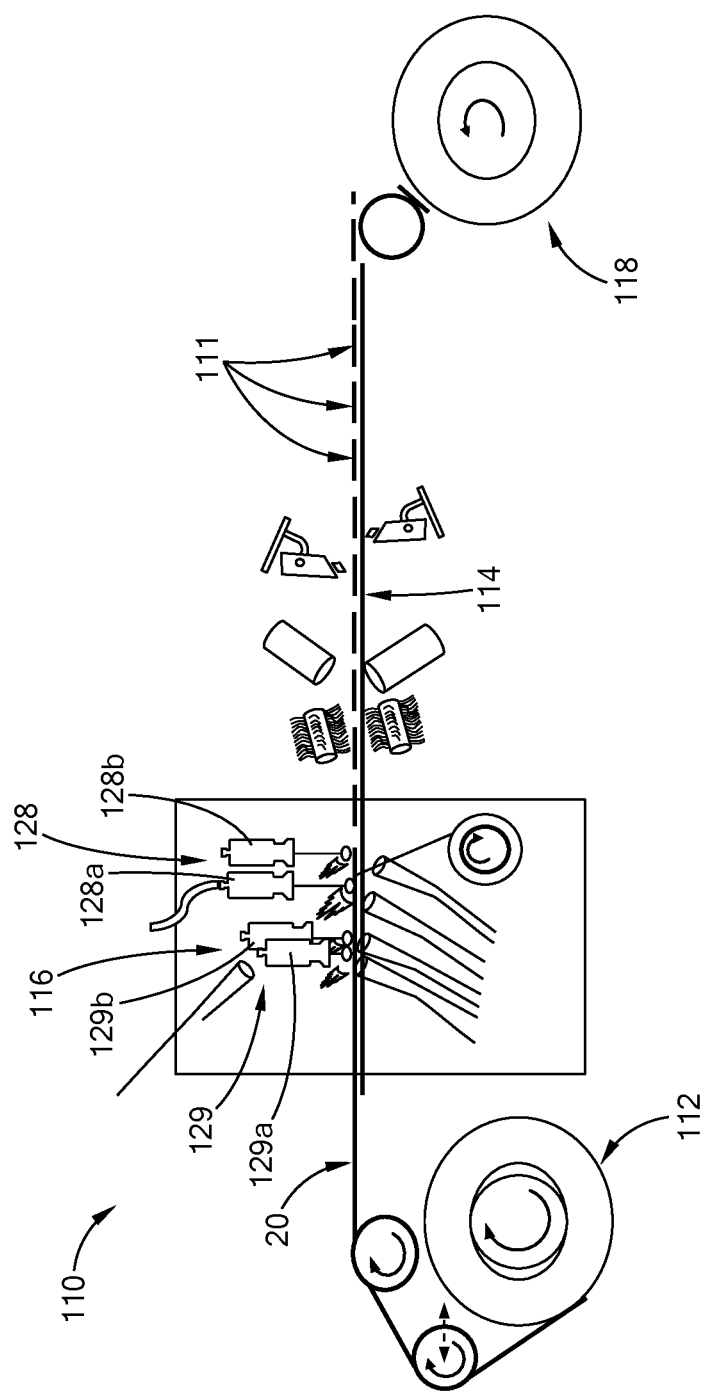
FIG. 6 is a schematic view of another apparatus for cutting electrode sheets from an original sheet according to the principles of the present disclosure.
Figure 7:
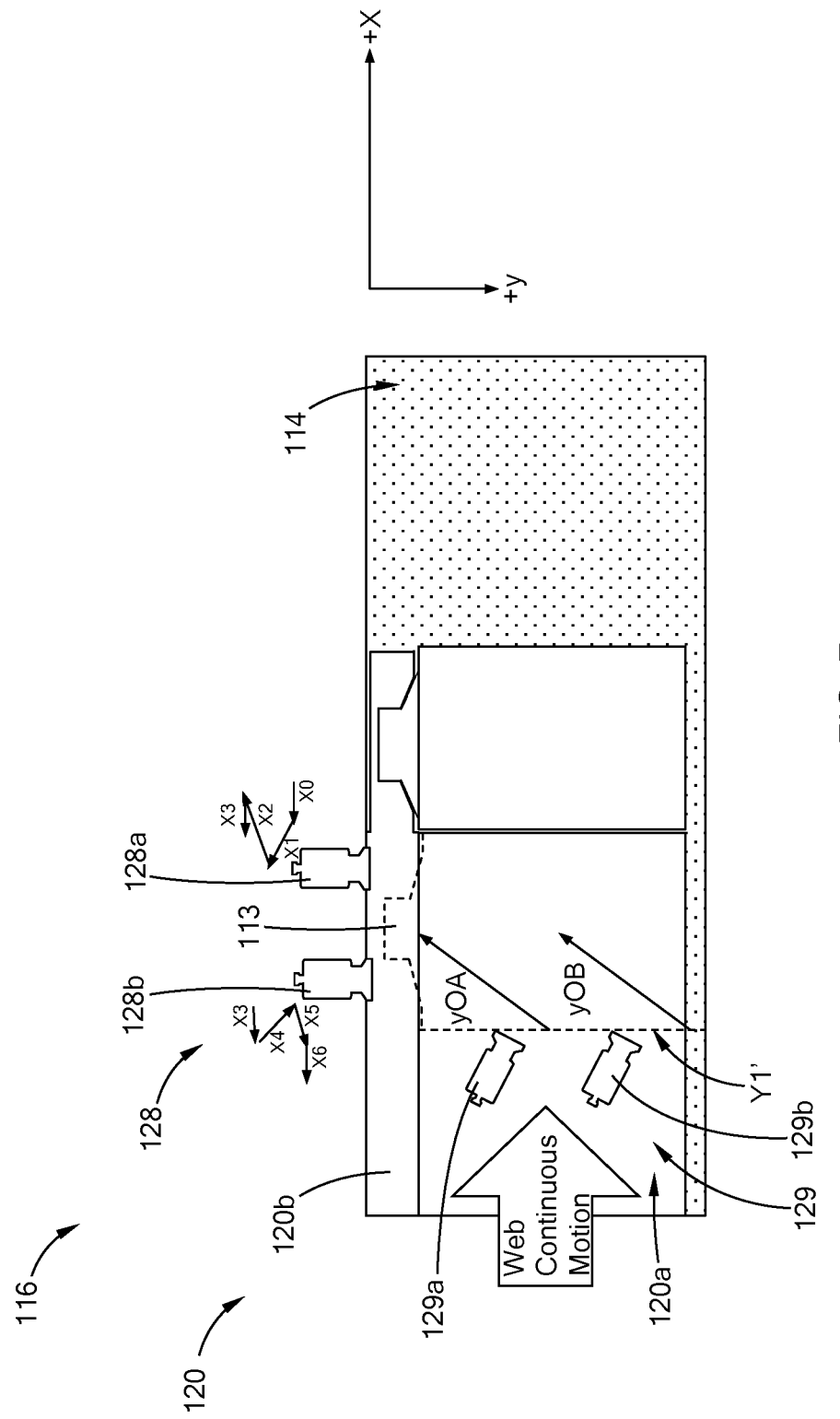
FIG. 7 is a top view of a respective electrode sheet being cut from the original sheet by a laser device of the apparatus of FIG. 6.
Figure 8:
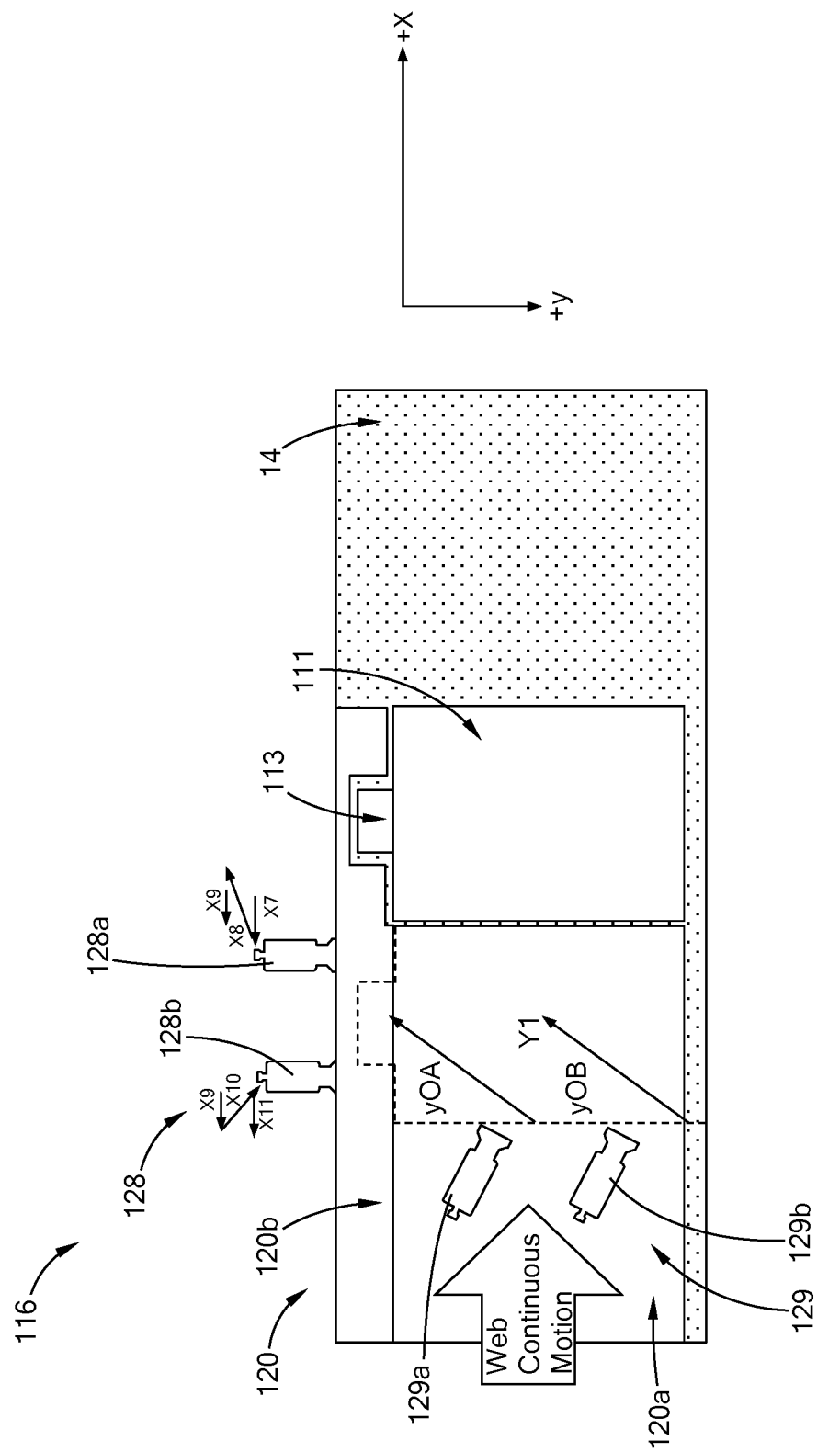
FIG. 8 is a top view of another respective electrode sheet being cut from the original sheet by the laser device of the apparatus of FIG. 6.

With reference to FIGS. 6-8, another apparatus 110 is provided for cutting respective electrode sheets 111. The apparatus 110 may be similar or identical to the apparatus 10 described above, apart from any exception noted below.

As shown in FIG. 6, the apparatus 110 for cutting electrode sheets 111 comprises an unwinder or sheet supply portion 112, a conveyor 114, a laser device 116, and an electrode sheet pick-up device 118. The sheet supply portion 112, the conveyor 114, and the electrode sheet pick-up device 118 are similar to the sheet supply portion 12, a conveyor 14, and an electrode sheet pick-up device 18, respectively, described above, and therefore, will not be described again in detail.

The laser device 116 is positioned above the conveyor 114 and comprises a first set of tandem lasers 128 (comprising first and second lasers 128*a*, 128*b*) and a second set of tandem lasers (comprising first and second lasers 129*a*, 129*b*). The laser device 116 may be a Galvano type emission device, for example, a Galvano scanner configured to move in the X and Y direction. In one example, the first and second sets of tandem lasers 128, 129 are pulsing lasers comprising a pulsing rate greater than or equal to one (1) Megahertz. In one example, the first and second sets of tandem lasers 128, 129 have a power greater than or equal to 500 Watts and a wavelength in the infrared region of the electromagnetic spectrum. The cutting rate of the first and second sets of tandem lasers 128, 129 is synchronized with the speed of the conveyor 114 and the speed of the sheet supply portion 112.

The laser device 116 comprises a laser controller (not shown) that is configured to guide or move the first set of tandem lasers 128*a*, 128*b* based on one or more first vector models in order to achieve a desired cut path. In the example illustrated in FIG. 7, the vector models are defined based on the above parameters such that the first laser 128*a* of the set of tandem lasers 128 moves along vector path X0-X3 as the conveyor 114 moves the original sheet 120 in order to cut and separate a first portion of the tab 113 and the second laser 128*b* of the set of tandem lasers 128 moves along vector path X3-X6 as the conveyor 114 moves the original sheet 120 in order to cut and separate a second portion of the tab 113. In this way, the tab 113 having the predetermined shape is formed. In the example illustrated in FIG. 8, the vector models are defined based on the above parameters such that the first laser 128a of the set of tandem lasers 128 moves along the vector path X7-X9 as the conveyor 114 moves the original sheet 120 in order to cut and separate a first portion of the tab 113 and the second laser 128b of the set of tandem lasers 128 moves along vector path X9-X11 as the conveyor 114 moves the original sheet 120 in order to cut and separate a second portion of the tab 113. In this way, the tab 113 having a rectangular shape is cut and separated from the ear portion 120b.

The laser controller is also configured to guide or move the second set of tandem lasers 129 based on one or more second vector models in order to achieve a desired cut path. In one form, the vector models are defined such that the first laser 129a of the set of tandem lasers 129 moves along vector path Y0A as the conveyor 114 moves the original sheet 120 in order to cut and separate a first portion of the respective electrode sheet 111 and the second laser 129b of the set of tandem lasers 129 moves along vector path Y0B as the conveyor 114 moves the original sheet 120 in order to cut and separate a second portion of the respective electrode sheet 111. In this way, the electrode sheet 111 having an edge shape defined by Y1' (i.e., a straight edge) is cut and separated from the original sheet 120.

Although the apparatus 110 illustrates the laser device 116 as having the first set of tandem lasers 128 for cutting and separating the tab 113 from the original sheet 120 and the second set of tandem lasers 129 for cutting and separating the electrode sheet 111 from the original sheet 120, it should be understood that the laser device 116 may include a set of tandem lasers for cutting only one of the tab 113 and the electrode sheet 111 from the original sheet 120. The first and second sets of tandem lasers 128, 129 provide the benefit of allowing longer cutting paths in either the X or Y direction. The first and second sets of tandem lasers 128, 129 also provide the benefit achieving the desired cutting rate while increasing the web speed. Although the apparatus 110 illustrates two (2) lasers in tandem, it should be understood that three (3) or more lasers may be placed in tandem to cut the desired distance nth times faster.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for cutting electrode sheets, the apparatus comprising:
    a conveyor configured to move an original sheet in a first direction, the original sheet comprising an electrode portion and an ear portion extending from an edge of the electrode portion; and
    a laser device configured to move a laser to cut out a tab connected to the electrode portion from the ear portion of the original sheet, the laser device also configured to move the laser in a second direction that is non-parallel to the first direction from one edge of the electrode portion to another edge of the electrode portion to cut and separate a respective electrode sheet comprising an electrode section and the tab connected to the electrode section from the original sheet,
    wherein the laser is configured to cut out the tab from the ear portion and cut and separate the respective electrode sheet comprising the electrode section and the tab connected to the electrode section from the original sheet as the conveyor is moving the original sheet, and
    wherein the laser moves along a first vector path to form a first shape in the ear portion as the conveyor moves the original sheet and moves along a second vector path to form a second shape in the ear portion as the conveyor moves the original sheet, the second shape being different from the first shape, the first shape and the second shape cooperate to form the tab that is cut out from the ear portion,
    wherein a speed of the conveyor is determined based on a predetermined shape of the tab.

2. The apparatus of claim 1, wherein the conveyor is a vacuum conveyor.

3. The apparatus of claim 1, wherein the laser is configured to cut out and separate the tab and the respective electrode sheet from the original sheet in a single pass.

4. The apparatus of claim 3, wherein the laser is a pulsing laser comprising a pulsing rate greater than or equal to 1 Megahertz.

5. The apparatus of claim 1, wherein the laser is a pulsing laser having a power greater than or equal to 500 Watts.

6. The apparatus of claim 1, wherein the laser comprises a first laser and a second laser, and wherein the first laser cuts out the tab connected to the electrode portion and the second laser cuts and separates the respective electrode sheet comprising the tab.

7. The apparatus of claim 6, wherein the first laser and the second laser cut simultaneously.

8. The apparatus of claim 6, wherein a speed of the conveyor is synchronized with a cutting rate of the first laser and a cutting rate of the second laser.

9. The apparatus of claim 1, further comprising an electrode sheet pick-up device positioned downstream of the conveyor and configured to pick-up the respective electrode sheet from the conveyor.

10. The apparatus of claim 9, wherein the electrode sheet pick-up device is a rotary drum.

11. The apparatus of claim 10, wherein a rotational speed of the rotary drum is synchronized with a speed of the conveyor.

12. The apparatus of claim 1, wherein the speed of the conveyor is synchronized with a cutting rate of the laser device.

13. The apparatus of claim 1, wherein the second direction is oblique to the first direction.

14. An apparatus for cutting electrode sheets, the apparatus comprising:
a conveyor configured to move an original sheet in a first direction, the original sheet comprising an electrode portion and an ear portion extending from an edge of the electrode portion; and
a laser device comprising:
a first laser configured to move to cut out a tab connected to the electrode portion from the ear portion of the original sheet, the first laser configured to cut out the tab in a single pass; and
a second laser configured to move in a second direction that is non-parallel to the first direction from one edge of the electrode portion to another edge of the electrode portion to cut and separate a respective electrode sheet comprising an electrode section and the tab connected to the electrode section from the original sheet, the second laser configured to cut out the respective electrode sheet in a single pass, wherein the first laser is configured to cut out the tab from the ear portion and the second laser is configured to cut and separate the respective electrode sheet comprising the electrode section and the tab connected to the electrode section from the original sheet as the conveyor is moving the original sheet, wherein the first laser moves along a first vector path to form a first shape in the ear portion as the conveyor moves the original sheet and the second laser moves along a second vector path to form a second shape in the ear portion as the conveyor moves the original sheet, the second shape being different from the first shape, the first shape and the second shape cooperate to form the tab that is cut out from the ear portion,
wherein a speed of the conveyor is determined based on a predetermined shape of the tab.

15. The apparatus of claim 14, wherein the conveyor is a vacuum conveyor.

16. The apparatus of claim 14, wherein at least one of the first and second lasers comprises a plurality of lasers arranged in tandem.

17. The apparatus of claim 16, wherein each of the first and second lasers comprises a pulsing rate greater than or equal to 1 Megahertz.

18. The apparatus of claim 14, wherein the first and second lasers are pulsing lasers having a power greater than or equal to 500 Watts.

19. The apparatus of claim 14, wherein the second direction is oblique to the first direction.

20. An apparatus for cutting electrode sheets, the apparatus comprising:
a conveyor configured to move an original sheet in a first direction, the original sheet comprising an electrode portion and an ear portion extending from an edge of the electrode portion;
a laser device comprising:
a first laser configured to move to cut out a tab connected to the electrode portion from the ear portion of the original sheet, the first laser configured to cut out the tab in a single pass; and
a second laser configured to move in a second direction that is non-parallel to the first direction from one edge of the electrode portion to another edge of the electrode portion to cut and separate a respective electrode sheet comprising an electrode section and the tab connected to the electrode section from the original sheet, the second laser configured to cut out the respective electrode sheet in a single pass;
a controller in communication with the first and second lasers, the controller configured to:
instruct the first laser to cut out the tab from the ear portion; and
instruct the second laser to cut and separate the respective electrode sheet comprising the electrode section and the tab connected to the electrode section from the original sheet as the conveyor is moving the original sheet, wherein the controller instructs the first laser and the second laser to cut the original sheet simultaneously to produce a single electrode sheet from the original sheet, wherein a speed of the conveyor and a cutting velocity of the first and second lasers are determined based on a predetermined shape of the tab.

* * * * *